May 29, 1951     C. O. MERCHANT     2,554,788
SELECTING AND POSITIONING DEVICE

Filed June 28, 1947     4 Sheets—Sheet 1

INVENTOR.
Chester O. Merchant
BY
Florien G. Miller
Atty.

May 29, 1951  C. O. MERCHANT  2,554,788
SELECTING AND POSITIONING DEVICE
Filed June 28, 1947   4 Sheets-Sheet 2

INVENTOR.
Chester O. Merchant
BY
Florian G. Miller
Atty.

May 29, 1951  C. O. MERCHANT  2,554,788
SELECTING AND POSITIONING DEVICE
Filed June 28, 1947  4 Sheets-Sheet 3

INVENTOR
Chester O. Merchant
BY
Florian G. Miller
ATTORNEY

May 29, 1951      C. O. MERCHANT      2,554,788
SELECTING AND POSITIONING DEVICE
Filed June 28, 1947      4 Sheets-Sheet 4
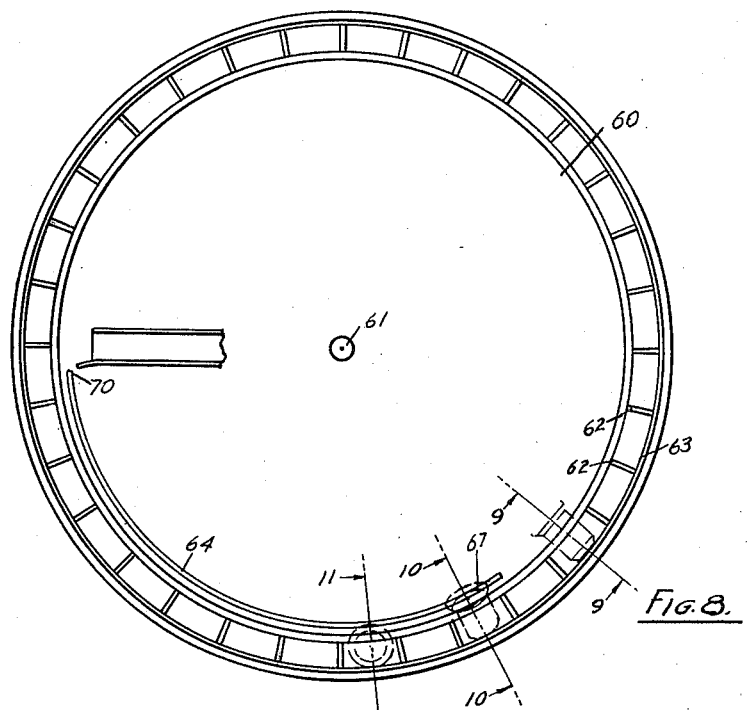
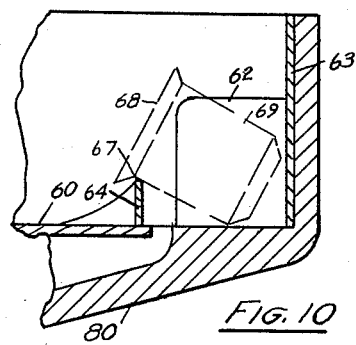
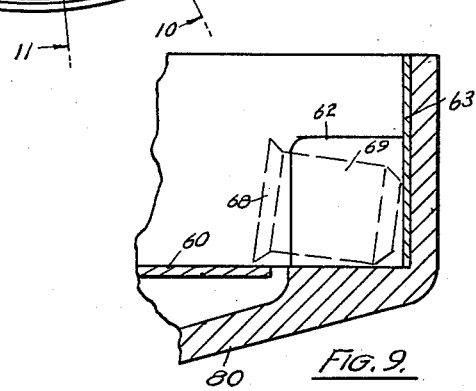
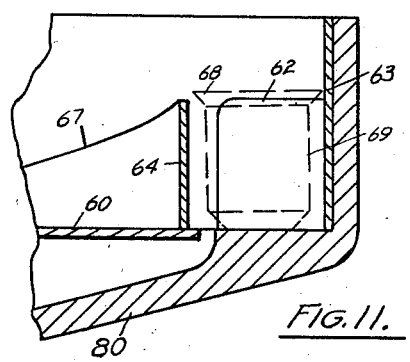
INVENTOR
Chester O. Merchant
BY
Florence L. Miller
ATTORNEY Patented May 29, 1951

2,554,788

UNITED STATES PATENT OFFICE 2,554,788

SELECTING AND POSITIONING DEVICE

Chester O. Merchant, Erie, Pa., assignor to Swanson Tool and Machine Products, Inc., Erie, Pa., a corporation of Pennsylvania Application June 28, 1947, Serial No. 757,746

1 Claim. (Cl. 209—72)

This invention relates generally to selecting and positioning devices for use in production operations and it relates more particularly to selecting and positioning devices for selecting and positioning small machine and other parts for transfer to a machine.

It has heretofore been necessary to feed irregular shaped parts by hand, thereby greatly decreasing the rate of production and greatly increasing the cost of production. Attempts have been made to use rotating hoppers with various means for removing individual pieces from the hopper but it has been found that the rotating hopper caused excessive agitation of the work pieces resulting in great congestion and irregular feeding of the pieces from the hopper. Prior attempts at selecting and positioning and feeding parts to a machine for operation thereon has required constant attendance of a worker to assure proper selection, positioning and feeding.

It is, accordingly, an object of my invention to overcome the above and other defects in selecting and positioning devices and it is more particularly an object of my invention to provide a selecting and positioning device for selecting and positioning individual work pieces and feeding them to a transfer chute which is simple in construction, economical in cost, efficient in operation, and economical in manufacture.

Another object of my invention is to provide a novel selecting and positioning device for work pieces which incorporates means for changing the angular position of the work piece in a predetermined manner.

Another object of my invention is to provide a selecting and positioning hopper for work pieces with means for feeding work pieces to the hopper in a predetermined quantity.

Another object of my invention is to provide means in a selecting and positioning device for work pieces which does not clog when the chute leading therefrom is filled and which automatically passes the work pieces back to the hopper when the chute leading therefrom is filled.

Another object of my invention is to provide a novel hopper for selecting and positioning work pieces wherein one part of the hopper moves relative to the other part thereof.

Another object of my invention is to provide a novel selecting and positioning device which causes no congestion of the work pieces, which provides a minimum of agitation of the work pieces, and which provides maximum tumbling movement of the work pieces to permit them to enter the selecting means in the hopper.

Other objects of my invention will become evident from the following detailed description, taken in conjunction with the accompanying drawings, in which Fig. 1 is a side elevational view of my novel selecting and positioning hopper assembled with a transfer device in a position to feed the work pieces to the work table of a machine;

Fig. 8 is a top plan view of a modified form of selecting and positioning hopper;

Fig. 9 is an enlarged fragmentary view taken on the line 9—9 of Fig. 8;

Fig. 10 is an enlarged fragmentary view taken on the line 10—10 of Fig. 8, and

Fig. 11 is an enlarged fragmentary view taken on the line 11—11 of Fig. 8.

Figure 1:
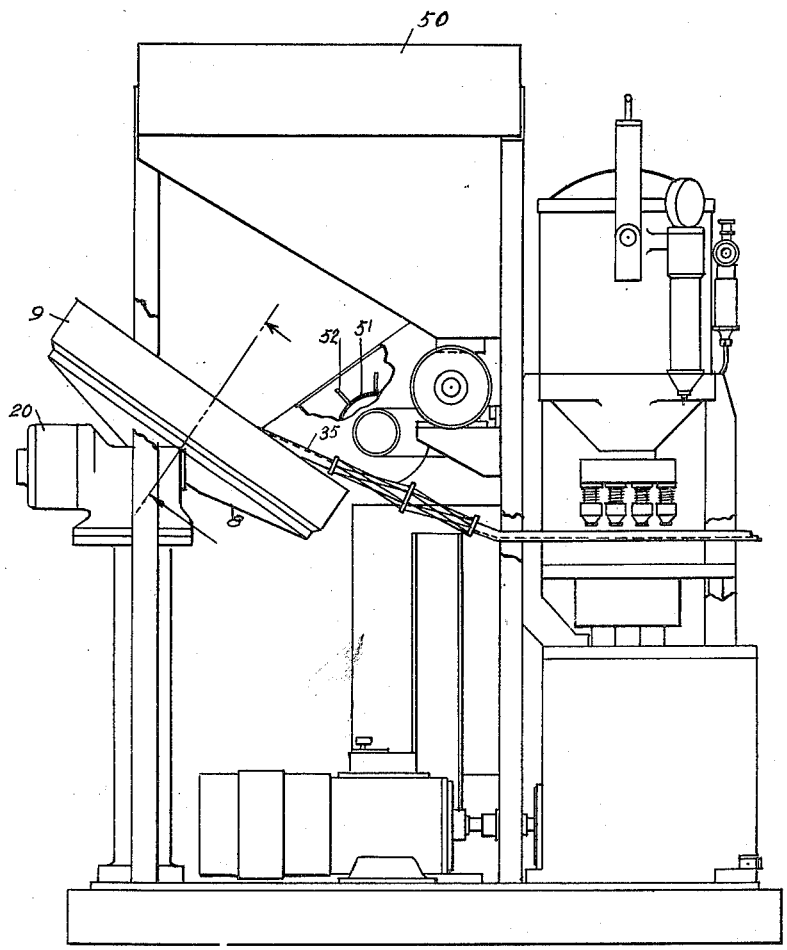

In order to illustrate my invention, I have shown as a preferred embodiment thereof, a selecting and positioning hopper particularly adapted to work pieces having stems and a modified hopper for use in selecting and positioning and up-ending work pieces, but it will be readily evident that any other form of small machine or other part may be individually selected and positioned with my novel hopper without departing from my invention.

Referring now to the drawings, Figs. 1 to 7 inclusive show a cup-shaped supporting member 1 having a vertically extending aperture 2 in the base portion thereof and a laterally extending aperture 3 in the side wall thereof. A stepped shaft 4 extends vertically in the aperture 2 of the cup shaped member 1 and it has a reduced threaded end portion 5 engaged by a washer 6 and nut 7 to secure the shaft 4. A cone shaped member 8 having a vertically extending side 9 and a lower hub portion 10 rotates on the shaft 4 and is supported thereby. Thrust bearings 11 and bearings 12 engage shoulders 13 on the shaft 4 to support the cup shaped member 8. A bevel gear 14 is secured to the bottom portion of the hub portion 10 of the cup shaped member 8 by cap screws 15, the bevel gear 14 having an inwardly extending annular portion 16 to hold the bearings 12 in engagement with the shoulder 13 of the shaft 4. The bevel gear 14 engages the bevel gear 18 which is driven by a shaft 19 which in turn is driven by any suitable source of power although I have shown an electric motor 20 for this purpose. An annular cap member 21 is disposed on the upper portion of the support member 1 by cap screws 22. The cup-shaped member 8 has a spaced inner ring 23 with spaced recessed portions 24 comprising substantially the outline of a cylindrical work piece having a stem. The inner ring 23 is held in spaced relation with the outer side 9 of the member 8 by spacing members 25. A disc-shaped member 26 is mounted on the upper end of the shaft 4 and it has radially extending support brackets 27 and a bearing member integral therewith on a cap member 30 secured to the hub 10 of member 8 by cap screws. The disc-shaped member 26 has an arcuate shaped member 33 secured thereto and spaced a predetermined distance from the ring 23 to retain the work pieces in the recessed apertures 24 when they pass the mid-point of travel from the lower portion of the cup shaped member 8 to the highest point of travel. The arcuate shaped member 33 has a gradually rising portion 34 on the lower end thereof and it terminates short of the highest point of travel of the member 8. A chute 35 having upwardly extending sides 36 and 37 is secured to the upper end of the shaft 4 by a bracket 38 welded thereto and a pin 39 which extends through an aperture in the upper end of the shaft 4. The upper ends 40 and 41 of the sides 36 and 37 of the chute 35 are flared outwardly to facilitate the entrance of work pieces to the chute 35. The side 37 has the flared out end 40 thereof extending to a point adjacent the upper end of the arcuate member 33 so that the work pieces fall downwardly by gravity into the chute 35. The upper flared end 41 of the side 36 of the chute 35 is comparatively short so that when the chute 35 is filled with work pieces, the pieces being brought upwardly in the recesses 24 will fall laterally away from the chute 35 and back into the hopper. The shaft 4, support member 1, cup-shaped member 8, and disc 26 are preferably disposed at an angle of 20 to 45 degrees although the amount of the angle may vary within greater limits without departing from my invention. The diameter of the inner ring 23 is such that it will be spaced a predetermined distance from the outer wall 9 of the cup-shaped member 8 so that a work piece such as the work piece shown in the drawing, only enters to its mid-point.

In order that the device heretofore described does not become overloaded, I have provided a supply hopper 50 shown in Fig. 1 which may be provided with sufficient capacity to supply work pieces to the feeding hopper for a long period of time without refilling. The work pieces from the supply hopper 50 are fed downwardly by gravity to a motor driven hub 51 having fingers 52 properly designed to pick up a predetermined number of parts between each of the radially extending fingers 52 at each rotation of the member 51 to pass them into the rotating hopper. By proper timing of the rotation of the member 51 through proper gear ratios, parts or work pieces may be fed into the selecting hopper in accordance with the requirements and thereby maintain a constant level of work pieces in the selecting hopper.

In operation, the selecting hopper 8 and the hub 51 is rotated wherein work pieces are fed from the primary supply hopper to the selecting hopper 8. The rotation of the member 8 causes tumbling of the work pieces without too much agitation so that they slide into the recesses 24 in the inner ring 23 substantially to their midpoint. The work pieces then rotate with the member 8 and engage the arcuate shaped member 33 when it reaches the mid-point of the member 8 half way between the lowest point in the rotation thereof and the highest point in the rotation thereof. The member 33 holds the work pieces in the recesses 24 until they reach the upper end of the member 33 when they drop by gravity forwardly into the chute 35 and pass to the machine for processing.

Figure 2:
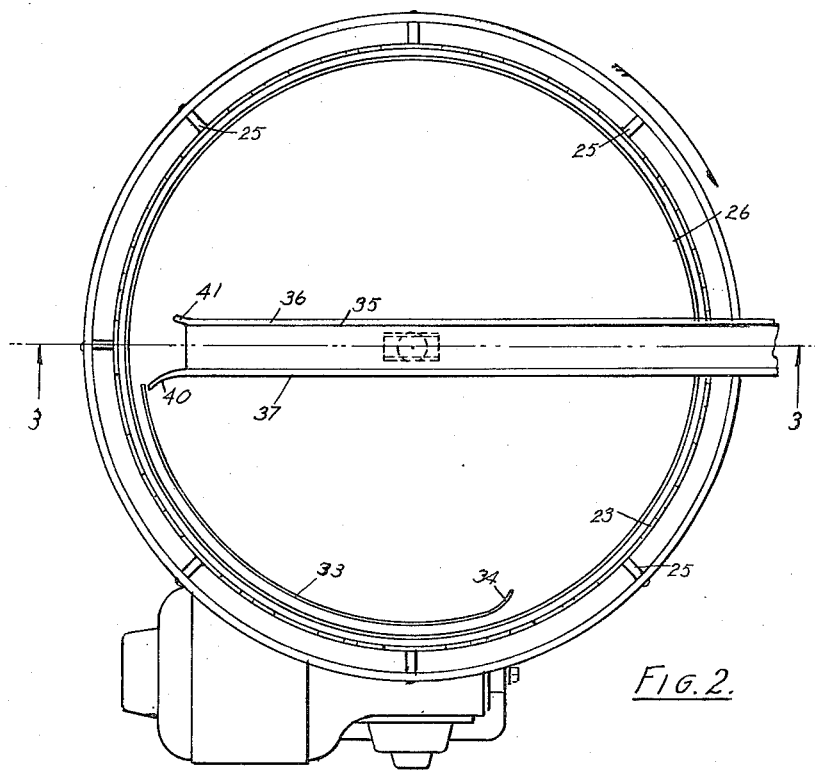
Fig. 2 is a top plan view of my novel selecting and positioning hopper.
Figure 3:
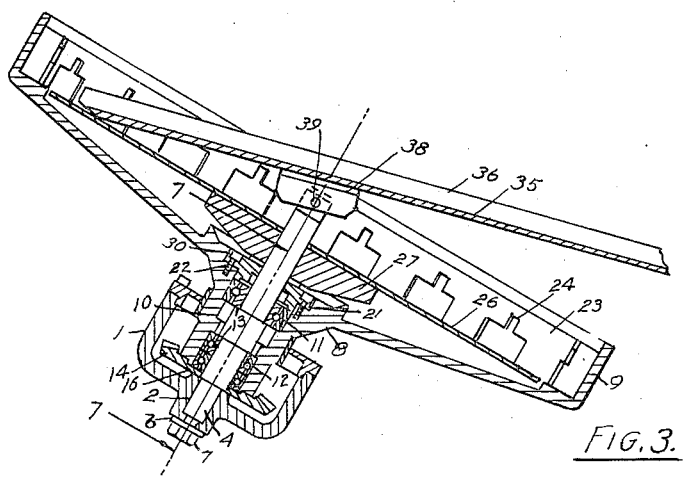
Fig. 3 is a transverse sectional view taken on the line 3—3 of Fig. 2.
Figure 4:
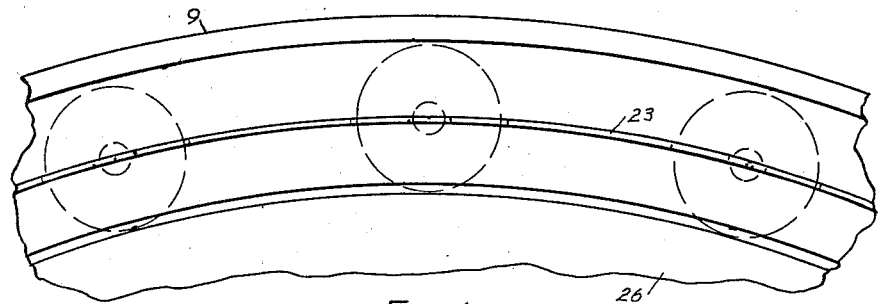
Fig. 4 is a vertical transverse sectional view of my novel selecting and positioning hopper.
Figure 5:
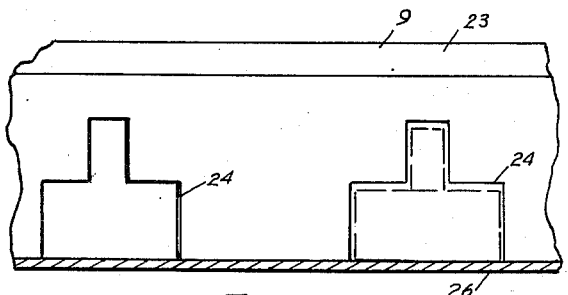
Fig. 5 is an enlarged fragmentary side elevational view showing spaced recesses for receiving work pieces having stems.
Figure 6:
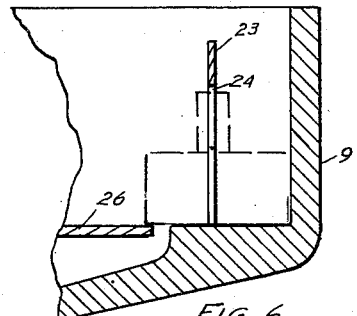
Fig. 6 is an enlarged fragmentary vertical sectional view taken through the outer side of the cup shaped hopper shown in Figs. 1, 2, and 3.
Figure 7:
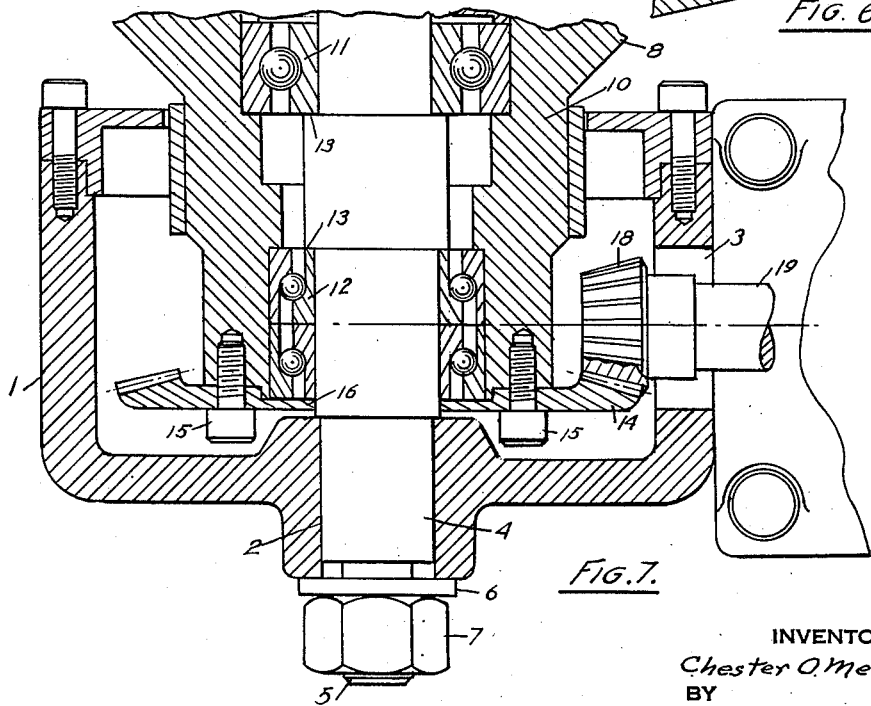
Fig. 7 is an enlarged fragmentary view taken on the line 7—7 of Fig. 3.

In Figs. 8 to 11 inclusive I have shown a modified form of my novel selecting and positioning device wherein my device is designed for selecting, up-ending and positioning cylindrical work pieces. In this modified form of my invention, I show an inner disc 60 mounted on a shaft 61 which is of the same construction as shaft 4 as shown in Figs. 2 and 3. Partition members 62 are welded to the inner periphery of the outer wall 63 of a rotating cup shaped member 80 having all of the parts thereof the same as shown in Fig. 3 except that the inner ring 23 is eliminated and partitions 62 provided. An arcuate shaped camming member 64 is secured to the disc member 60 in spaced relation with the partition members 62 and the outer wall 63 of the member 80 to prevent the work pieces 69 from falling out of the recesses 66 between the partitions 62. The arcuate shaped member 64 has a gradual rise 67 on the lower end thereof to gradually raise the outer base end 68 of the work pieces 69 shown in Fig. 8. A chute as shown in Fig. 2 may be provided for disposal adjacent the upper end 70 of the retaining member 64 to transfer the work pieces 69 from the selecting member.

The operation of this modified form of my invention is the same as that heretofore described except that the recesses 66 are provided by placing spaced partitions on the inner side of the outer wall 63 of the rotating member and the arcuate shaped member 64 has a gradually sloping rise 67 to up-end the work pieces 69 as they are rotated.

From the foregoing it will be seen that I have provided novel means for selecting individual work pieces in predetermined vertical positions, means for changing the vertical angular position of the work pieces, means for aligning the work pieces and transferring them from the selecting means without congestion, means for tumbling the work pieces without excessive agitation, and means for feeding work pieces to the selecting and positioning hopper in predetermined quantities.

Various changes may be made in the specific embodiment of my invention without departing from the spirit thereof, or from the scope of the appended claim.

What I claim is:

A selecting and positioning device comprising an angularly extending supporting shaft, supporting means for said shaft, a cup-shaped member rotatable about said shaft having an upwardly extending side and an annular marginal flat surface on the interior side of said upwardly extending side at right angles to the axis of said shaft, a flat surfaced, circular member fixed on the upper end of said shaft disposed concentrically of the upwardly extending sides of said cup-shaped member and in substantially the same horizontal plane as the annular marginal face of said rotatable member, a detachable ring member mounted on the annular face of said rotatable member and spaced from the upwardly extending side thereof having circumferentially spaced, slotted portions adapted to receive work pieces of predetermined shape, an arcuate shaped member disposed on said flat circular member and spaced from said inner ring member terminating at a point adjacent the highest point of travel of said rotatable member for retaining work pieces in the slotted portions of said ring member during travel above the midpoint thereof, a transverse chute pivoted on said shaft having the upper end terminating at a point adjacent said arcuate shaped member to receive work pieces passing the end of said arcuate shaped member, and means for rotating said rotatable member about said shaft.

CHESTER O. MERCHANT.

REFERENCES CITED

The following references are of record in the file of this patent:

UNITED STATES PATENTS

| Number | Name | Date |
|---|---|---|
| 317,396 | Mason | May 5, 1885 |
| 1,282,610 | Macomber | Oct. 22, 1918 |
| 1,340,432 | Benjamin | May 18, 1920 |
| 1,700,217 | Ernst et al. | Jan. 29, 1929 |
| 1,741,033 | Neidlinger | Dec. 24, 1929 |
| 2,371,748 | Fedorchak | Mar. 20, 1945 |
| 2,394,200 | Nelson | Feb. 5, 1946 |
| 2,402,097 | Spraker | June 11, 1946 |
| 2,433,561 | Angell | Dec. 30, 1947 |